US012574187B2

(12) United States Patent
  Loehr et al.

(10) Patent No.: US 12,574,187 B2
(45) Date of Patent: Mar. 10, 2026

(54) PREVENTING TRANSMISSION WHEN SWITCHING AN ACTIVE UPLINK BANDWIDTH PART

(71) Applicant: Lenovo (Singapore) Pte. Ltd., New Tech Park (SG)

(72) Inventors: Joachim Loehr, Wiesbaden (DE); Ravi Kuchibhotla, Chicago, IL (US); Prateek Basu Mallick, Dreieich (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 433 days.

(21) Appl. No.: 17/796,211

(22) PCT Filed: Jan. 28, 2021

(86) PCT No.: PCT/IB2021/050690
  § 371 (c)(1),
  (2) Date: Jul. 28, 2022

(87) PCT Pub. No.: WO2021/152514
  PCT Pub. Date: Aug. 5, 2021

(65) Prior Publication Data
  US 2023/0336313 A1     Oct. 19, 2023

Related U.S. Application Data

(60) Provisional application No. 62/966,957, filed on Jan. 28, 2020.

(51) Int. Cl.
  *H04W 72/56* (2023.01)
  *H04L 1/1812* (2023.01)
  (Continued)

(52) U.S. Cl.
  CPC .......... *H04L 5/0055* (2013.01); *H04L 1/1812* (2013.01); *H04W 72/1268* (2013.01); *H04W 72/56* (2023.01)

(58) Field of Classification Search
  CPC ..... H04B 7/088; H04B 7/0695; H04W 28/10; H04W 72/56; H04W 72/1268;
  (Continued)

(56) References Cited

U.S. PATENT DOCUMENTS

| | | | | |
|---|---|---|---|---|
| 2019/0238278 A1* | 8/2019 | Dudda | ................. | H04L 1/1896 |
| 2021/0219322 A1* | 7/2021 | Chin | ..................... | H04W 72/23 |
| 2022/0312546 A1* | 9/2022 | Fu | ......................... | H04L 1/1883 |
| 2022/0322420 A1* | 10/2022 | Takahashi | ........... | H04W 72/569 |
| 2022/0338211 A1* | 10/2022 | Alabbasi | ............. | H04W 72/569 |
| 2022/0353899 A1* | 11/2022 | Xiao | ...................... | H04L 1/188 |

(Continued)

FOREIGN PATENT DOCUMENTS

WO       2019/246285 A1    12/2019

OTHER PUBLICATIONS

PCT/IB2021/050690, "Notification of Transmittal of the International Search Report and the Written Opinion of the International Searching Authority, or the Declaration", Mar. 30, 2021, pp. 1-16.
(Continued)

*Primary Examiner* — Syed Ali
(74) *Attorney, Agent, or Firm* — Kunzler Needham & Hilton

(57) ABSTRACT

Apparatuses, methods, and systems are disclosed for handling autonomous retransmission. One apparatus includes a transceiver that operates on a first BWP. The apparatus includes a processor that generates a first MAC PDU for transmission on a first CG associated with a first HARQ process. The processor deprioritizes the first CG in response to detecting a higher priority UL transmission overlapping with the first CG. The processor switches an active BWP from the first BWP to a second BWP after deprioritizing the first CG. The processor prevents the first HARQ process from triggering a transmission of the first MAC PDU on a second CG associated with the first HARQ process on the second BWP.

15 Claims, 9 Drawing Sheets

(51) Int. Cl.
    *H04L 5/00*         (2006.01)
    *H04W 72/1268*    (2023.01)

(58) Field of Classification Search
    CPC ............ H04W 72/569; H04W 72/0446; H04L
                        1/1887; H04L 5/0055; H04L 1/1822;
                  H04L 5/001; H04L 1/188; H04L 1/1874;
                         H04L 5/0098; H04L 1/1812
    See application file for complete search history.

(56)                References Cited

U.S. PATENT DOCUMENTS

| | | | |
|---|---|---|---|
| 2022/0394752 A1* | 12/2022 | Baek .................... | H04W 72/569 |
| 2022/0394753 A1* | 12/2022 | Alabbasi ............. | H04W 72/569 |
| 2023/0025815 A1* | 1/2023 | Lee ....................... | H04L 1/1874 |
| 2023/0036584 A1* | 2/2023 | Lee ....................... | H04L 1/1854 |

OTHER PUBLICATIONS

Mediatek Inc. "Handle ongoing HARQ process when BWP switching occurs", 3GPP TSG-RAN WG2 Meeting #100 R2-1713077, Nov. 27-Dec. 1, 2017, pp. 1-2.

3GPP, "3rd Generation Partnership Project; Technical Specification Group Radio Access Network; NR; Medium Access Control (MAC) protocol specification (Release 15)", 3GPP TS 38.321 V15.7.0, Sep. 2019, pp. 1-78.

3GPP, "3rd Generation Partnership Project; Technical Specification Group Radio Access Network; NR; Physical channels and modulation (Release 15)", 3GPP TS 38.211 V15.7.0. Sep. 2019, pp. 1-97.

3GPP, "3rd Generation Partnership Project; Technical Specification Group Radio Access Network; NR; Physical layer procedures for control (Release 15)", 3GPP TS 38.213 V15.7.0, Sep. 2019, pp. 1-108.

3GPP, 3rd Generation Partnership Project; Technical Specification Group Radio Access Network; NR; Physical layer procedures for data (Release 16), 3GPP TS 38.214 V16.0.0, Dec. 2019, p. 1-147.

LG Electronics Inc., "Remaining issues on de-prioritized MAC PDU on CG resource", 3GPP TSG-RAN WG2 Meeting #108 R2-1916186, Nov. 18-22, 2019, pp. 1-4.

3GPP, "3rd Generation Partnership Project; Technical Specification Group Radio Access Network; NR; Requirements for support of radio resource management (Release 16)", 3GPP TS 38.133 V16.1.0, Sep. 2019, pp. 1-1043.

* cited by examiner

Figure 3B:
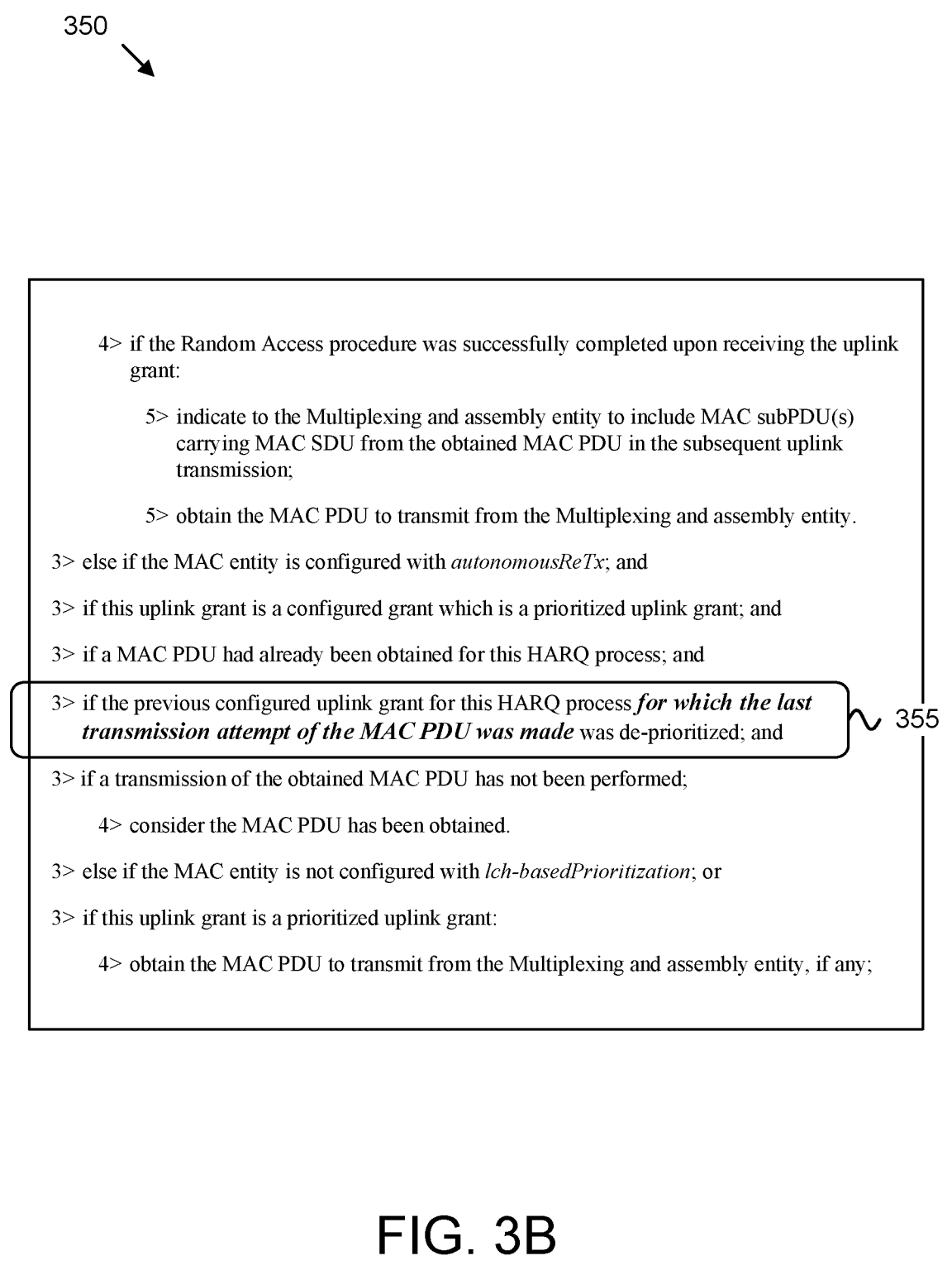

350

4> if the Random Access procedure was successfully completed upon receiving the uplink
        grant:

5> indicate to the Multiplexing and assembly entity to include MAC subPDU(s)
            carrying MAC SDU from the obtained MAC PDU in the subsequent uplink
            transmission;

5> obtain the MAC PDU to transmit from the Multiplexing and assembly entity.

3> else if the MAC entity is configured with *autonomousReTx*; and

3> if this uplink grant is a configured grant which is a prioritized uplink grant; and 3> if a MAC PDU had already been obtained for this HARQ process; and 3> if the previous configured uplink grant for this HARQ process *for which the last
        transmission attempt of the MAC PDU was made* was de-prioritized; and          355

3> if a transmission of the obtained MAC PDU has not been performed;

4> consider the MAC PDU has been obtained.

3> else if the MAC entity is not configured with *lch-basedPrioritization*; or

3> if this uplink grant is a prioritized uplink grant:

4> obtain the MAC PDU to transmit from the Multiplexing and assembly entity, if any;

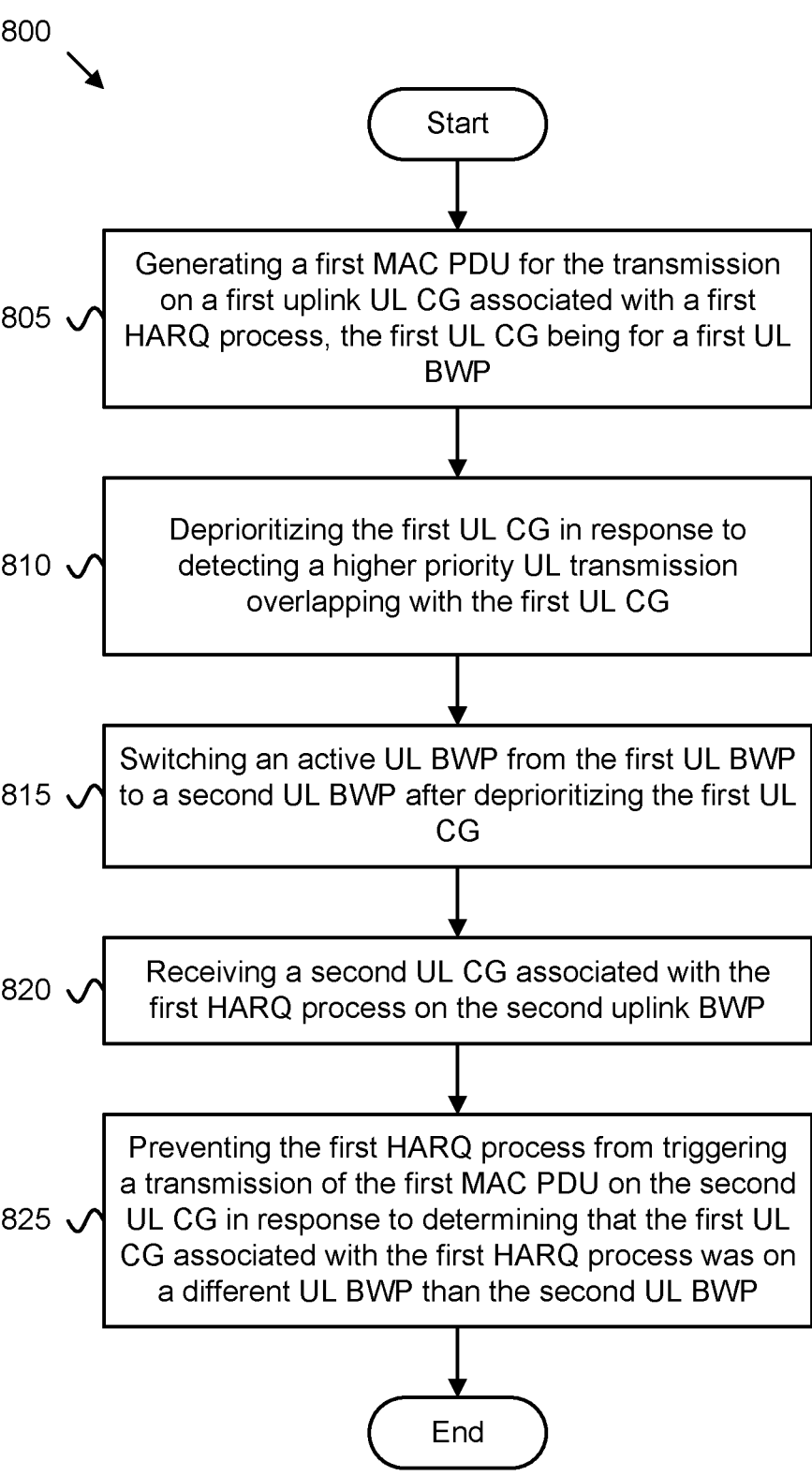

Start

805 — Generating a first MAC PDU for the transmission on a first uplink UL CG associated with a first HARQ process, the first UL CG being for a first UL BWP 810 — Deprioritizing the first UL CG in response to detecting a higher priority UL transmission overlapping with the first UL CG 815 — Switching an active UL BWP from the first UL BWP to a second UL BWP after deprioritizing the first UL CG 820 — Receiving a second UL CG associated with the first HARQ process on the second uplink BWP 825 — Preventing the first HARQ process from triggering a transmission of the first MAC PDU on the second UL CG in response to determining that the first UL CG associated with the first HARQ process was on a different UL BWP than the second UL BWP End

FIG. 8

PREVENTING TRANSMISSION WHEN SWITCHING AN ACTIVE UPLINK BANDWIDTH PART

CROSS-REFERENCE TO RELATED APPLICATIONS

This application claims priority to U.S. Provisional Patent Application No. 62/966,957 entitled "AUTONOMOUS RETRANSMISSION HANDLING FOR I-IOT DEVICES" and filed on Jan. 28, 2020 for Joachim Loehr, Ravi Kuchibhotla, and Prateek Basu Mallick, which application is incorporated herein by reference.

FIELD

The subject matter disclosed herein relates generally to wireless communications and more particularly relates to autonomous (i.e., UE-initiated) retransmission handling, e.g., for Industrial Internet-of-Things ("I-IoT") devices.

BACKGROUND

The following abbreviations are herewith defined, at least some of which are referred to within the following description: Third Generation Partnership Project ("3GPP"), Fifth Generation Core Network ("5GC"), Fifth Generation System ("5GS"), Authentication, Authorization and Accounting ("AAA"), Positive-Acknowledgment ("ACK"), Access and Mobility Management Function ("AMF"), Antenna Panel ("AP"), Application Programming Interface ("API"), Access Stratum ("AS"), Base Station ("BS"), Code Division Multiple Access ("CDMA"), Core Network ("CN"), Downlink Control Information ("DCI"), Downlink ("DL"), Demodulation Reference Signal ("DM-RS"), Data Radio Bearer ("DRB"), Discontinuous Transmission ("DTX"), Evolved Node-B ("eNB"), Evolved Packet Core ("EPC"), New Generation (i.e., 5G) Node-B ("gNB"), General Packet Radio Service ("GPRS"), Global System for Mobile Communications ("GSM"), Hybrid Automatic Repeat Request ("HARQ"), Home Subscriber Server ("HSS"), Identifier ("ID"), Industrial IoT ("IIOT"), Internet of Things ("IoT"), Layer-1 ("L1", also known as the Physical Layer), Layer 1 Identifier ("L1 ID"), Layer-2 ("L2", also known as the Link Layer), Layer 2 Identifier ("L2 ID"), Layer-3 ("L3", also known as the Network Layer), Logical Channel ("LCH"), LCH Prioritization ("LCP"), Long Term Evolution ("LTE"), Mobility Management Entity ("MME"), Negative-Acknowledgment ("NACK") or ("NAK"), Non-Access Stratum ("NAS"), Network Slice Selection Assistance Information ("NSSAI", e.g., a vector value including one or more S-NSSAI values), New Radio ("NR", a 5G radio access technology; also referred to as "5G NR"), Packet Data Network ("PDN"), Packet Data Unit ("PDU", used in connection with 'PDU Session'), Packet Data Network Gateway ("P-GW"), Public Land Mobile Network ("PLMN"), Quality of Service ("QoS"), Radio Access Network ("RAN"), Receive ("RX"), Serving Gateway ("S-GW"), Session Management Function ("SMF"), Single Network Slice Selection Assistance Information ("S-NSSAI"), Transport Block ("TB"), Transmit ("TX"), Uplink Control Information ("UCI"), Unified Data Management ("UDM"), User Data Repository ("UDR"), User Entity/Equipment (Mobile Terminal) ("UE"), Uplink ("UL"), User Plane ("UP"), Universal Mobile Telecommunications System ("UMTS"), and Worldwide Interoperability for Microwave Access ("WiMAX"). As used herein, "HARQ-ACK" refers to HARQ feedback may represent collectively the Positive Acknowledge ("ACK") and the Negative Acknowledge ("NACK") and Discontinuous Transmission ("DTX"). ACK means that a TB is correctly received while NACK (or NAK) means a TB is erroneously received. DTX means that no TB was detected.

In certain wireless communication systems, certain logical channels may be de-prioritized in favor of another logical channel. This may result in the situation where a packet (e.g., TB) is generated for the de-prioritized channel but not transmitted. For the case of data for a configured uplink grant (e.g., a semi-persistent allocation of uplink resources) with low periodicity, this may result in long delays before the data is sent on the uplink.

BRIEF SUMMARY

Disclosed are procedures for autonomous (i.e., UE-initiated) (re)transmission. One method of a UE includes generating a first MAC PDU for transmission on a first UL CG associated with a first HARQ process, the first UL CG being for a first UL BWP. The method includes deprioritizing the first UL CG and not performing a transmission of the generated MAC PDU in response to detecting a higher priority UL transmission overlapping with the first UL CG. The method includes switching an active UL BWP from the first UL BWP to a second UL BWP after deprioritizing the first UL CG and receiving a second UL CG associated with the first HARQ process on the second UL BWP. In response to determining that the first UL CG associated with the first HARQ process was on a different UL BWP than the second UL BWP, the method includes preventing the first HARQ process from triggering a transmission of the first MAC PDU on the second UL CG.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 3B is a diagram illustrating one embodiment of modified HARQ entity behavior;

FIG. 8 is a flowchart diagram illustrating one embodiment of a method for handling autonomous retransmission.

DETAILED DESCRIPTION

Figure 1:
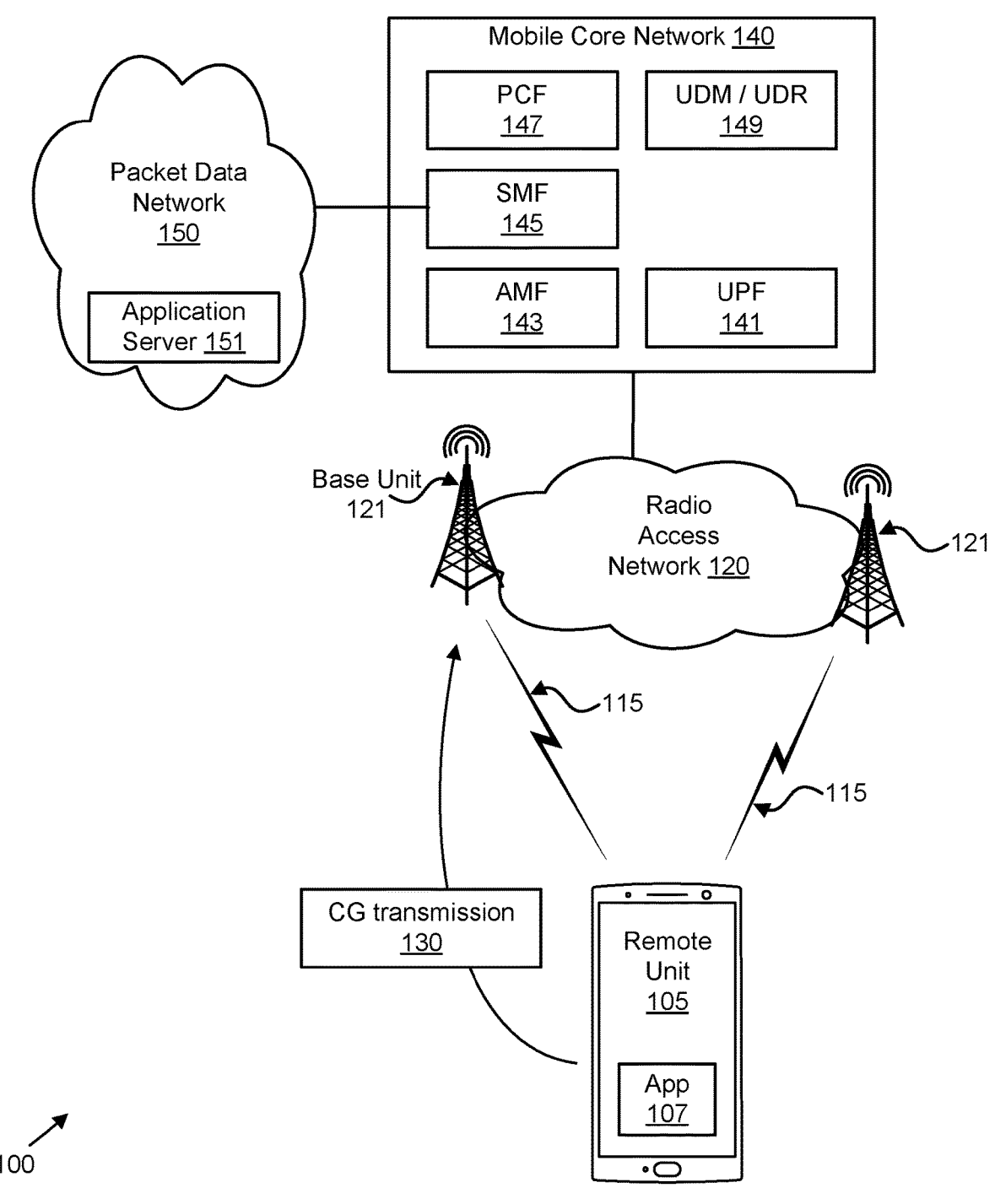
FIG. 1 is a schematic block diagram illustrating one embodiment of a wireless communication system for handling autonomous retransmission.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/ acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for supporting autonomous retransmission. The term "autonomous retransmission" in the context of I-IOT refers to the case where a MAC PDU/TB for a CG PUSCH is generated but not sent due to de-prioritization of the CG PUSCH. In such situations, the UE may send the generated/deprioritized MAC PDU using a subsequent CG PUSCH without requiring an explicit indication (e.g., DCI scheduling retransmission) from network. While the below discussion uses I-IoT as an exemplary use case, the techniques described herein apply to other types of UE and other use cases.

According to current 3GPP standards, an I-IoT device (i.e., UE) configured for autonomous retransmission—also referred to as MAC entity configured with the parameter autonomousReTx—checks whether to trigger an autonomous Retransmission on a configured grant (i.e., among other criteria) based on the priority state (deprioritized vs. prioritized uplink grant) of the immediate previous configured uplink grant (i.e., for the same HARQ process). The immediate previous configured uplink grant though does not need to be necessarily the configured grant for which the last transmission attempt was done when considering the processing time requirements.

Additionally, the UE may prioritize a dynamic retransmission grant or a configured uplink grant—used for autonomous retransmission—for cases where both grants have an overlapping PUSCH duration since the priorities of both grant are equal (same MAC PDU is scheduled for transmission by the two grants). The intended behavior for such case should be that the I-IoT device follows the dynamic uplink grant scheduling the retransmission.

Further, UE behavior for cases when the active bandwidth part is changed/switched after the time when a configured uplink grant was deprioritized and before the time instance when autonomous retransmission takes place is currently not well defined in specifications. A Bandwidth Part ("BWP") is a contiguous set of physical resource blocks ("PRBs") on a given carrier. These RBs are selected from a contiguous subset of the common resource blocks for a given numerology.

In certain embodiments, UE may implement autonomous retransmission functionality at the HARQ entity as follows:

For each uplink grant, the HARQ entity is to identify the HARQ process associated with this grant, and for each identified HARQ process. If the uplink grant is part of a bundle of the configured uplink grant, and may be used for initial transmission and if no MAC PDU has been obtained for this bundle, then if the MAC entity is configured with the parameter autonomousReTx, if the uplink grant is a configured grant which is a prioritized uplink grant, and if the previous configured uplink grant for this HARQ process was de-prioritized, the UE obtains the MAC PDU for the HARQ process where transmission of the obtained MAC PDU has not been performed.

Note that the UE MAC entity includes a HARQ entity for each Serving Cell with configured uplink (including the case when it is configured with supplementary Uplink), which maintains a number of parallel HARQ processes. The number of parallel UL HARQ processes per HARQ entity may be as specified in 3GPP TS 38.214. Each HARQ process supports one TB and each HARQ process is associated with a HARQ process identifier.

The timeline requirement in TS 38.214 applies to grants scheduling a retransmission also. UE autonomous (re)transmission of a deprioritized CG PDU requires performing almost all actions (including PHY procedures like UCI multiplexing) associated with a retransmission grant except for the DCI processing. Hence, it is assumed that similar/ same timeline requirements are applicable also for UE autonomous transmission of a deprioritized CG PDU.

UE PUSCH preparation time is described in clause 6.4 of TS 38.214, incorporated herein by reference. If the first uplink symbol in the PUSCH allocation for a transport block, including the DM-RS, as defined by the slot offset $K_2$ and the start and length indicator SLIV of the scheduling DCI and including the effect of the timing advance, is no earlier than at symbol $L_2$, where $L_2$ is defined as the next uplink symbol with its CP starting $T_{proc,2}=\max \, ((N_2+d_{2,1})(2048+144)\cdot\kappa2^{-\mu}\cdot T_c,d_{2,2})$ after the end of the reception of the last symbol of the PDCCH carrying the DCI scheduling the PUSCH, then the UE is to transmit the transport block. Note that the UE may ignore a scheduling DCI that does not conform with the preparation time requirement. Further, certain CG periodicity values (e.g., sym2, sym7, sym1×14, sym2×14) supported in Rel-15 can be lower than PUSCH preparation time specified in TS 38.214 (which can be as high as 36 symbols). Thus, with low CG periodicity, a duration between a deprioritized CG PUSCH and CG PUSCH used for UE autonomous transmission can be low and may not provide enough UE processing time.

To support autonomous retransmission, various solutions are disclosed. In various embodiments, the UE also considers the processing time for preparation of autonomous retransmission for checking whether to perform an autonomous retransmission. In some embodiments, a condition for which an autonomous retransmission is triggered is that the previous configured uplink grant for the same HARQ process for which a transmission attempt was made is deprioritized. In some embodiments, the UE prioritizes a dynamically scheduled retransmission of the deprioritized MAC PDU over an autonomous retransmission on a configured uplink grant, for cases when the PUSCH duration(s) of both grants are overlapping.

In various embodiments, the UE does not perform or cancels an autonomous retransmission on a configured uplink grant for cases when the retransmission of the deprioritized MAC PDU/TB is dynamically scheduled on PUSCH resources which are occurring after the configured uplink grant PUSCH on which autonomous retransmission would have been performed otherwise (when no PDCCH was received scheduling the retransmission). Here, it is assumed that the PDCCH scheduling the retransmission is received until some predefined time before the first symbol of the PUSCH associated with the configured uplink grant providing transmission opportunity for autonomous retransmission.

Also described herein is UE behavior for cases when BWP is changed/switched after the time when a configured uplink grant was deprioritized and before the time instance when autonomous retransmission takes place. In some embodiments, autonomous retransmission is cancelled/not performed in case of BWP switching. In one implementation, the UE sets the priority status of a configured uplink grant to prioritized when activating a UL BWP. In another specific implementation of this embodiment UE clears the HARQ transmissions buffer—at least the HARQ buffer of the HARQ processes associated with the configured grants—when deactivating a UL BWP.

In other embodiments, the UE may perform an autonomous retransmission for a deprioritized uplink grant/MAC PDU after the BWP has been changed on the new activated uplink BWP. In one implementation, the UE stores the priority status (prioritized/deprioritized) of a configured uplink grant when switching/changing the UL BWP. In another implementation, the HARQ buffer content of the HARQ process associated with the configured grant is kept.

One method of a UE device for handling autonomous retransmission includes identifying a first configured uplink grant, determining a prioritization status of a previous configured uplink grant for which the last transmission attempt was made, and autonomously retransmitting a data packet of the previous configured uplink grant during the first configured grant in response to the previous configured uplink grant being deprioritized.

In some embodiments, the method further includes generating the data packet prior to the previous configured uplink grant, wherein the data packet is not transmitted during the previous configured uplink grant due to deprioritization of the previous configured uplink grant. In certain embodiments, a configured grant periodicity is less than a UE processing time of the UE. In such embodiments, an intervening configured uplink grant may be scheduled between the first configured uplink grant and the previous configured uplink grant. In some embodiments, the previous configured uplink grant is at least a preconfigured time before the first configured uplink grant, wherein the preconfigured time is greater than or equal to a UE processing time of the UE.

Another method of a UE device for autonomous retransmission includes identifying a first configured uplink grant, receiving a control signal indicating a dynamic grant for retransmission of a previous configured uplink grant, and retransmitting a data packet of the previous configured uplink grant during the dynamic grant and not during the first configured grant. In some embodiments, the control signal is received prior to a transmission opportunity corresponding to the first configured uplink grant. In some embodiments, the control signal is received at least a preconfigured time before the first configured uplink grant.

FIG. 1 depicts a wireless communication system 100 for handling autonomous retransmission, e.g., for wireless devices supporting configured grant transmission 130, according to embodiments of the disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 121 with which the remote unit 105 communicates using wireless communication links 115. Even though a specific number of remote units 105, base units 121, wireless communication links 115, RANs 120, and mobile core networks 140 are depicted in FIG. 1, one of skill in the art will recognize that any number of remote units 105, base units 121, wireless communication links 115, RANs 120, and mobile core networks 140 may be included in the wireless communication system 100.

In one implementation, the wireless communication system 100 is compliant with the 5G system specified in the 3GPP specifications. More generally, however, the wireless communication system 100 may implement some other open or proprietary communication network, for example, LTE or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the base units 121 in the RAN 120 via uplink ("UL") and downlink ("DL") communication signals. Furthermore, the UL and DL communication signals may be carried over the wireless communication links 115. Here, the RAN 120 is an intermediate network that provides the remote units 105 with access to the mobile core network 140.

In some embodiments, the remote units 105 communicate with an application server 151 via a network connection with the mobile core network 140. For example, an application 107 (e.g., web browser, media client, telephone/VoIP application) in a remote unit 105 may trigger the remote unit 105 to establish a PDU session (or other data connection) with the mobile core network 140 via the RAN 120. The mobile core network 140 then relays traffic between the remote unit 105 and the application server 151 in the packet data network 150 using the PDU session. The PDU session represents a logical connection between the remote unit 105 and the UPF 141. In order to establish the PDU session, the remote unit 105 must be registered with the mobile core network. Note that the remote unit 105 may establish one or more PDU sessions (or other data connections) with the mobile core network 140. As such, the remote unit 105 may concurrently have at least one PDU session for communicating with the packet data network 150 and at least one PDU session for communicating with another data network (not shown).

The base units 121 may be distributed over a geographic region. In certain embodiments, a base unit 121 may also be referred to as an access terminal, an access point, a base, a base station, a Node-B, an eNB, a gNB, a Home Node-B, a relay node, or by any other terminology used in the art. The base units 121 are generally part of a radio access network ("RAN"), such as the RAN 120, that may include one or more controllers communicably coupled to one or more corresponding base units 121. These and other elements of radio access network are not illustrated but are well known generally by those having ordinary skill in the art. The base units 121 connect to the mobile core network 140 via the RAN 120.

The base units 121 may serve a number of remote units 105 within a serving area, for example, a cell or a cell sector, via a wireless communication link 115. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the wireless communication links 115. The wireless communication links 115 may be any suitable carrier in licensed or unlicensed radio spectrum. The wireless communication links 115 facilitate communication between one or more of the remote units 105 and/or one or more of the base units 121.

In one embodiment, the mobile core network 140 is a 5G core ("5GC") or the evolved packet core ("EPC"), which may be coupled to a packet data network 150, like the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes one or more user plane functions ("UPFs") 141. The mobile core network 140 also includes multiple control plane functions including, but not limited to, an Access and Mobility Management Function ("AMF") 143 that serves the RAN 120, a Session Management Function ("SMF") 145, a Policy Control Function ("PCF") 147, and a Unified Data Management function ("UDM") 149. In various embodiments, the mobile core network 140 may also include an Authentication Server Function ("AUSF"), a Network Repository Function ("NRF") (used by the various NFs to discover and communicate with each other over APIs), a Network Exposure Function ("NEF"), or other NFs defined for the 5GC. In certain embodiments, the UDM is co-located with a User Data Repository ("UDR"), shown as combined element "UDM/UDR" 149.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. Each network slice includes a set of CP and/or UP network functions. A network instance may be identified by a S-NSSAI, while a set of network slices for which the remote unit 105 is authorized to use is identified by NSSAI. In certain embodiments, the various network slices may include separate instances of network functions, such as the SMF 145 and UPF 141. In some embodiments, the different network slices may share some common network functions, such as the AMF 143. The different network slices are not shown in FIG. 1 for ease of illustration, but their support is assumed.

Although specific numbers and types of network functions are depicted in FIG. 1, one of skill in the art will recognize that any number and type of network functions may be included in the mobile core network 140. Moreover, where the mobile core network 140 is an EPC, the depicted network functions may be replaced with appropriate EPC entities, such as an MME, S-GW, P-GW, HSS, and the like. In certain embodiments, the mobile core network 140 may include a AAA server.

In various embodiments, the remote units 105 may be configured with one or more configured grants ("CG"), e.g., a single grant that allocates multiple, discontinuous resources. In certain embodiments, the CG is a semi-persistent allocation of uplink resources, where UL resources are allocated according to a certain periodicity. A remote unit 105 having a configured grant may nonetheless receive one or more dynamic grants. In certain embodiments, the CG is only for a certain LCH or set of LCH. Here, data of other LCHs would be communicated using other uplink resources such as, e.g., dynamic grants. Moreover, each remote unit 105 may be configured with one or more bandwidth parts ("BWPs").

As discussed above, current defined autonomous Retransmission functionality does not consider the processing timing requirements for preparation/transmission of retransmission. Therefore, the current specified behavior 3GPP may lead to a situation where an autonomous retransmission is not triggered due to some wrong defined condition/criteria. Also, the UE behavior in response to receiving a PDCCH scheduling a retransmission of a deprioritized TB is not fully discussed/specified yet. As a further problem the UE behavior with respect to autonomous retransmission has not been defined/discussed for the case BWP switching occurring after a CG has been deprioritized.

As a first solution, the remote unit 105 considers the processing timing requirement for preparation of retransmission when determining whether to trigger an autonomous retransmission. One criterion for triggering an autonomous retransmission is, that the previous configured uplink grant for the same HARQ process for which a transmission attempt of the MAC PDU was made is de-prioritized, e.g. not prioritized. By checking the status (prioritized/deprioritized grant) of the configured grant for which the last transmission attempt of a MAC PDU was made, the processing timing requirements are implicitly considered. The earlier configured uplink grant whose prioritization status (prioritized or deprioritized) is checked should be at least a preconfigured time, e.g., $T_{proc,2}$ (as defined in TS38.214), before the configured uplink grant used for the autonomous retransmission.

By considering the processing time requirement for preparation of the retransmission among other criteria for triggering an autonomous retransmission, the remote unit 105 avoids the situation where an autonomous retransmission is not triggered due to some wrong defined condition/criteria. Moreover, if the previous configured uplink grant for the same HARQ process for which a transmission attempt was made is de-prioritized, then the remote unit 105 inherently considers the processing timing requirement of the transmission attempt.

As a second solution, the remote unit 105 prioritizes dynamically scheduled retransmissions of a deprioritized MAC PDU over an autonomous retransmission of a deprioritized MAC PDU. This holds for the case where the PUSCH resources of the two grants are overlapping as well as for the cases when the PDCCH—being received some until some preconfigured time before the configured uplink grant PUSCH for the autonomous retransmission—is scheduling PUSCH resources for the retransmission occurring after the configured uplink grant PUSCH on which autonomous retransmission would have been performed.

As a third solution, the remote unit 105 cancels/does not perform an autonomous retransmission for cases when BWP is switched after a configured uplink has been deprioritized and before the autonomous retransmission was performed. In a first implementation of the third solution, the remote unit 105 flushes the corresponding HARQ buffer when deactivating the old active BWP. In an alternative implementation of the third solution, the remote unit 105 may store the priority status (prioritized/deprioritized) of a configured uplink grant when switching/changing the UL BWP and then may perform an autonomous retransmission for a deprioritized uplink grant/MAC PDU after the BWP has been changed on the new activated uplink BWP.

While FIG. 1 depicts components of a 5G RAN and a 5G core network, the described embodiments for handling autonomous retransmission apply to other types of communication networks, including IEEE 802.11 variants, GSM, GPRS, UMTS, LTE variants, CDMA 2000, Bluetooth, Zig-Bee, Sigfoxx, and the like. For example, in an LTE variant involving an EPC, the AMF 143 may be mapped to an MME, the SMF mapped to a control plane portion of a PGW and/or to an MME, the UPF map to an SGW and a user plane portion of the PGW, the UDM/UDR maps to an HSS, etc.

In the following descriptions, the term RAN node is used for the base station but it is replaceable by any other radio access node, e.g., BS, eNB, gNB, AP, NR, etc. Further the operations are described mainly in the context of 5G NR.

However, the proposed solutions/methods are also equally applicable to other mobile communication systems supporting autonomous (i.e., UE-initiated) (re)transmission.

Figure 2:
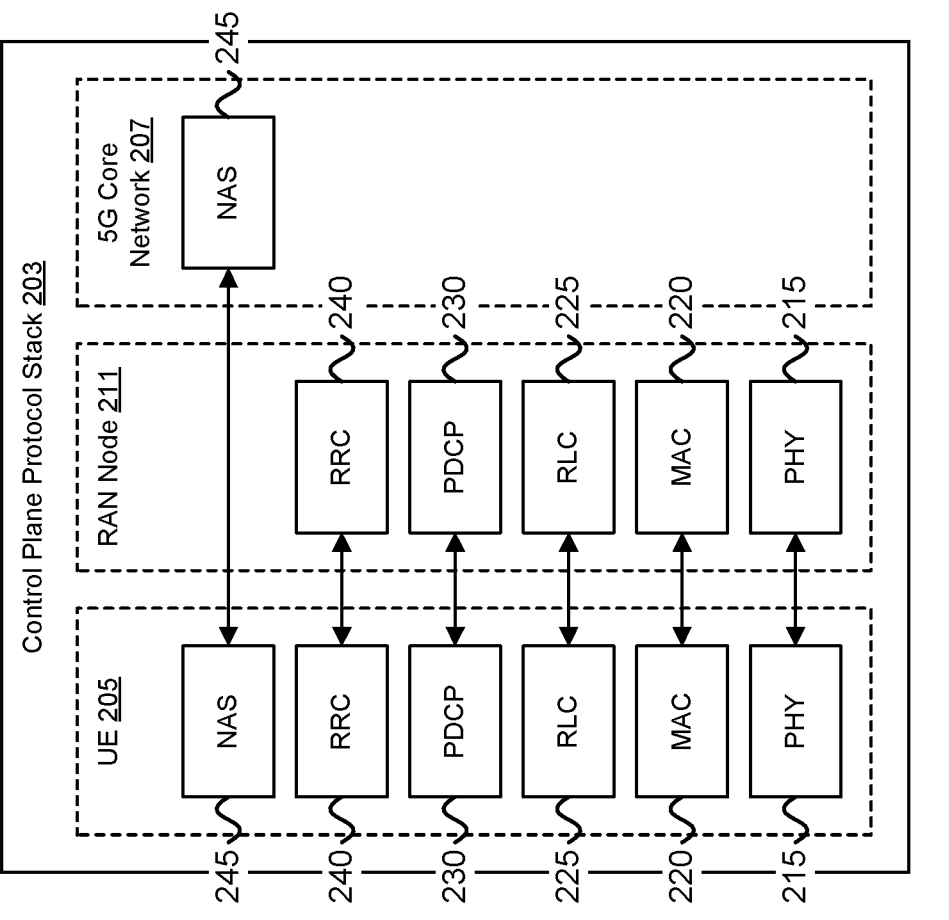
FIG. 2 is a diagram illustrating one embodiment of checking a condition for triggering an autonomous retransmission.
Figure 2:
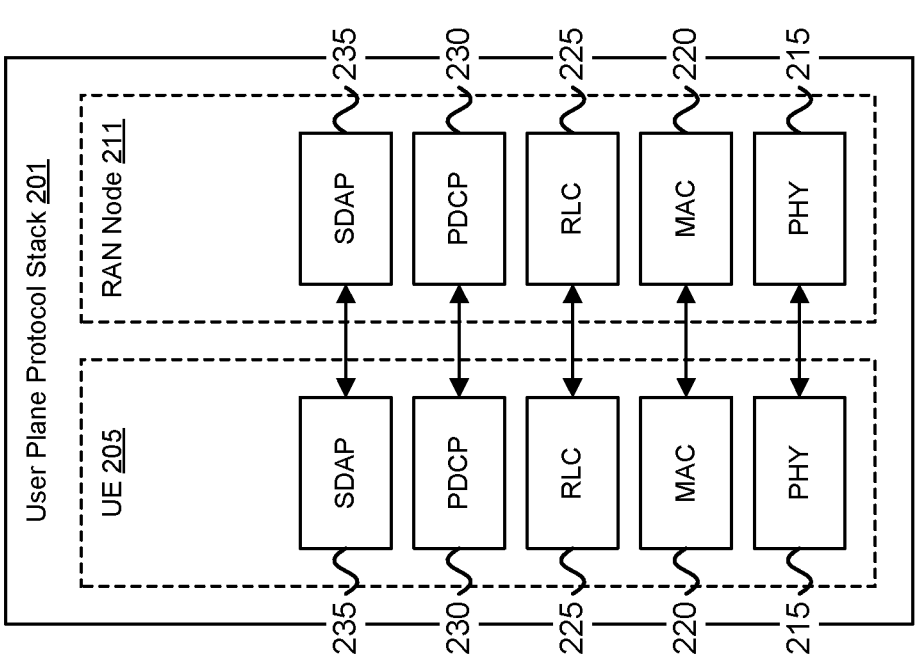

FIG. 2 depicts a protocol stack 200, according to embodiments of the disclosure. While FIG. 2 shows a UE 205, a RAN node 211 and a 5G core network 207, these are representative of a set of remote units 105 interacting with a base unit 121 and a mobile core network 140. The 5G core network 207 includes one or more 5G network functions, such as AMF 143. As depicted, the protocol stack 200 comprises a User Plane protocol stack 201 and a Control Plane protocol stack 203. The User Plane protocol stack 201 includes a physical ("PHY") layer 215, a Medium Access Control ("MAC") sublayer 220, a Radio Link Control ("RLC") sublayer 225, a Packet Data Convergence Protocol ("PDCP") sublayer 230, and Service Data Adaptation Protocol ("SDAP") layer 235. The Control Plane protocol stack 203 also includes a physical layer 215, a MAC sublayer 220, a RLC sublayer 225, and a PDCP sublayer 230. The Control Plane protocol stack 210 also includes a Radio Resource Control ("RRC") layer and a Non-Access Stratum ("NAS") layer 245.

The AS protocol stack for the Control Plane protocol stack 203 consists of at least RRC, PDCP, RLC and MAC sublayers, and the physical layer. The AS protocol stack for the User Plane protocol stack 201 consists of at least SDAP, PDCP, RLC and MAC sublayers, and the physical layer. The Layer-2 ("L2") is split into the SDAP, PDCP, RLC and MAC sublayers. The Layer-3 ("L3") includes the RRC sublayer 240 and the NAS layer 245 for the control plane and includes, e.g., an Internet Protocol ("IP") layer or PDU Layer (note depicted) for the user plane. L1 and L2 are referred to as "lower layers", while L3 and above (e.g., transport layer, application layer) are referred to as "higher layers" or "upper layers".

The physical layer 215 offers transport channels to the MAC sublayer 220. The MAC sublayer 220 offers logical channels to the RLC sublayer 225. The RLC sublayer 225 offers RLC channels to the PDCP sublayer 230. The PDCP sublayer 230 offers radio bearers to the SDAP sublayer 235 and/or RRC layer 240. The SDAP sublayer 235 offers QoS flows to the mobile core network 140 (e.g., 5GC). The RRC layer 240 provides for the addition, modification, and release of Carrier Aggregation and/or Dual Connectivity. The RRC layer 240 also manages the establishment, configuration, maintenance, and release of Signaling Radio Bearers ("SRBs") and Data Radio Bearers ("DRBs"). The NAS layer 245 is used to convey non-radio signaling between the UE 205 and, e.g., an AMF in the 5G core network 207 (or a MME for an LTE/EPS scenario).

Figure 3A:
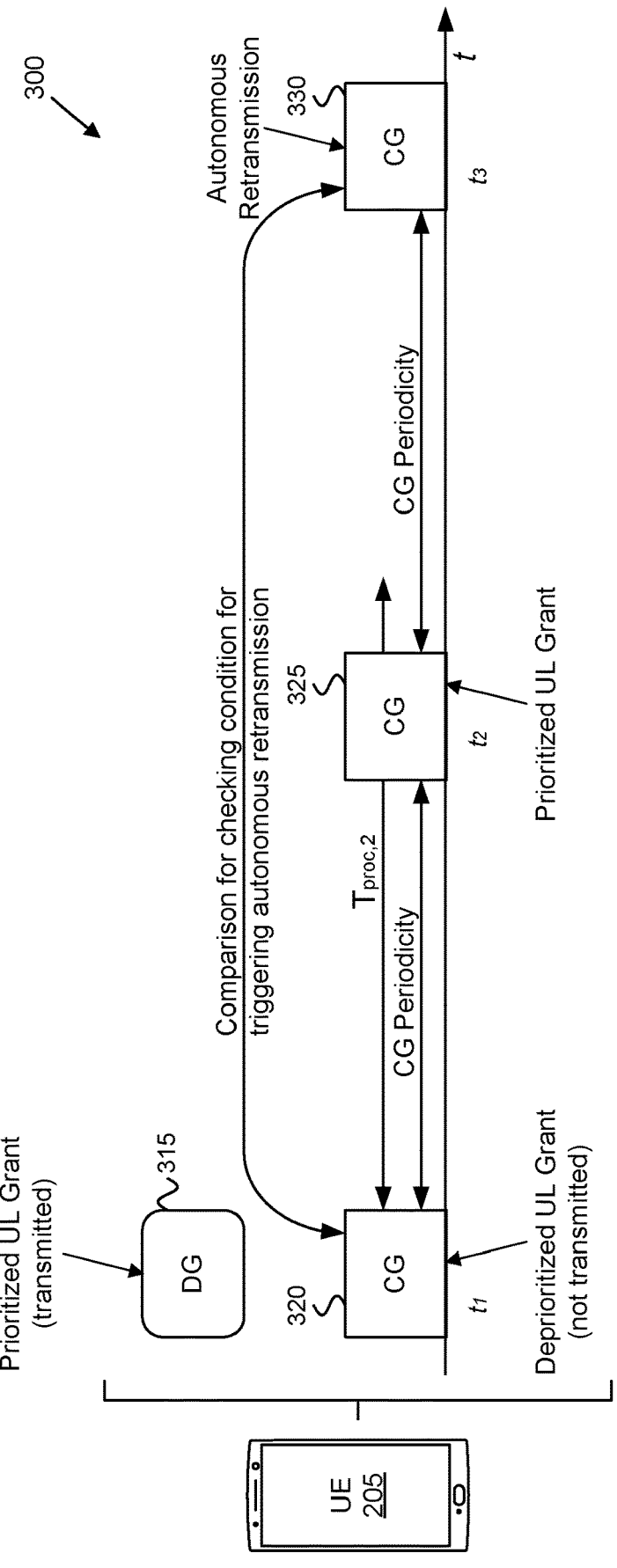
FIG. 3A is a diagram illustrating one embodiment of handling dynamic retransmission grant and autonomous retransmission opportunity.

FIG. 3A depicts a first scenario 300 for handling autonomous retransmission, according to embodiments of the disclosure. The first scenario 300 involves a UE 205 configured for autonomous retransmission (i.e., the MAC entity is configured with parameter autonomousReTx), which may be one implementation of the remote unit 105 described above. As discussed previously, the UE 205 may be an I-IoT device. However, the first solution is not limited to I-IoT devices, but may be also be performed by other types of UE configured for autonomous retransmission.

In the first scenario 300, the UE 205 has a first UL configured grant ("CG") associated with a first HARQ process. The UE 205 prepares (e.g., generates) a TB (i.e., MAC PDU) for transmission at time $t_1$ using the first GC. As depicted, first resources 320 of the first CG may overlap in time with a first dynamic grant 315, e.g., both grants may have an overlapping PUSCH duration, i.e., at time $t_1$. In the depicted embodiment, the first occurring configured grant (i.e., first resources 320) is deprioritized in favor of the dynamic grant ("DG") 315 that overlaps with the first CG.

As discussed above, current standards require a UE configured for autonomous retransmission to check whether to trigger an autonomous retransmission on a configured grant based on the priority state (deprioritized/prioritized uplink grant) of the previous configured uplink grant for the same HARQ process). However, the duration between a deprioritized configured grant and the next available configured grant for the same HARQ process may not provide enough UE processing time.

According to the first solution, when checking the condition for triggering an autonomous retransmission, the UE 205 checks whether the previous configured uplink for which the UE 205 made a transmission attempt was deprioritized.

As noted above, considering the processing time $T_{proc,2}$ of the UE 205, i.e., the time required for preparation of an autonomous retransmission, the duration between a deprioritized configured grant 320 and the next available configured grant 325 for the same HARQ process may not provide enough UE processing time. Therefore, the autonomous retransmission of the deprioritized MAC PDU does not take place on the immediate next configured grant PUSCH 325 following a deprioritized configured uplink grant (i.e., at time $t_2$), but potentially on the first of the subsequent configured grants PUSCH 330 (i.e., at time $t_3$), which is at least $T_{proc,2}$ after the deprioritized CG PUSCH 320.

As depicted in FIG. 3A, when checking the condition for triggering an autonomous Retransmission, the UE 205 does not check whether the previous configured uplink grant for this HARQ process was deprioritized, but rather checks whether the previous configured uplink for which the UE 205 made a transmission attempt was de-prioritized. Note that in the scenario 300 the configured grant ("CG1") periodicity is less than the UE processing time; thus, the last CG opportunity may not be the deprioritized UL grant 320. However, by checking the last transmission attempt, the UE 205 is able to determine that the first occurring configured grant resources 320 was deprioritized.

According to the first solution, one of the conditions that an autonomous retransmission is triggered is that the previous configured uplink grant for the same HARQ process for which a transmission attempt was de-prioritized. According to one implementation of the first solution, a UE 205, e.g., a MAC entity configured with autonomousReTx, checks whether the previous configured uplink grant for the same HARQ process for which a transmission attempt was made was de-prioritized in order to determine whether to trigger an autonomous retransmission. The earlier configured uplink grant 320 whose prioritization status (prioritized or deprioritized) is checked should be at least a preconfigured time, e.g., $T_{proc,2}$, before the configured uplink grant 330 to be used for the autonomous retransmission.

FIG. 3B shows one example of modified HARQ entity behavior 350, according to embodiments of the disclosure. In one embodiment, the modified HARQ entity behavior 350 comprises a modification 355 to the HARQ entity behavior described in 3GPP TS 38.321 clause 5.4.2.1. In certain embodiments, the first solution may be implemented in 3GPP by modifying the MAC entity behavior to specify considering whether the previous configured uplink grant for this HARQ process for which the last transmission attempt of the MAC PDU was made was de-prioritized, rather than considering whether the previous configured uplink grant for this HARQ process was de-prioritized.

In an alternative implementation of the first solution, the UE 205 determines the earliest (when going backwards in time starting from the present configured uplink grant for the same HARQ process) of the previous configured uplink grants (for the same HARQ process) for which the symbol following the last symbol of the PUSCH is at least some preconfigured time (e.g., at least $T_{proc,2}$) before the first symbol of the present configured grant PUSCH (i.e., for the same HARQ process). The UE 205 further checks whether the determined previous configured uplink grant was deprioritized. Only when this previous configured uplink was deprioritized does the UE 205 consider triggering an autonomous retransmission, i.e., depending on the other defined criteria for triggering autonomous retransmission.

Figure 4:
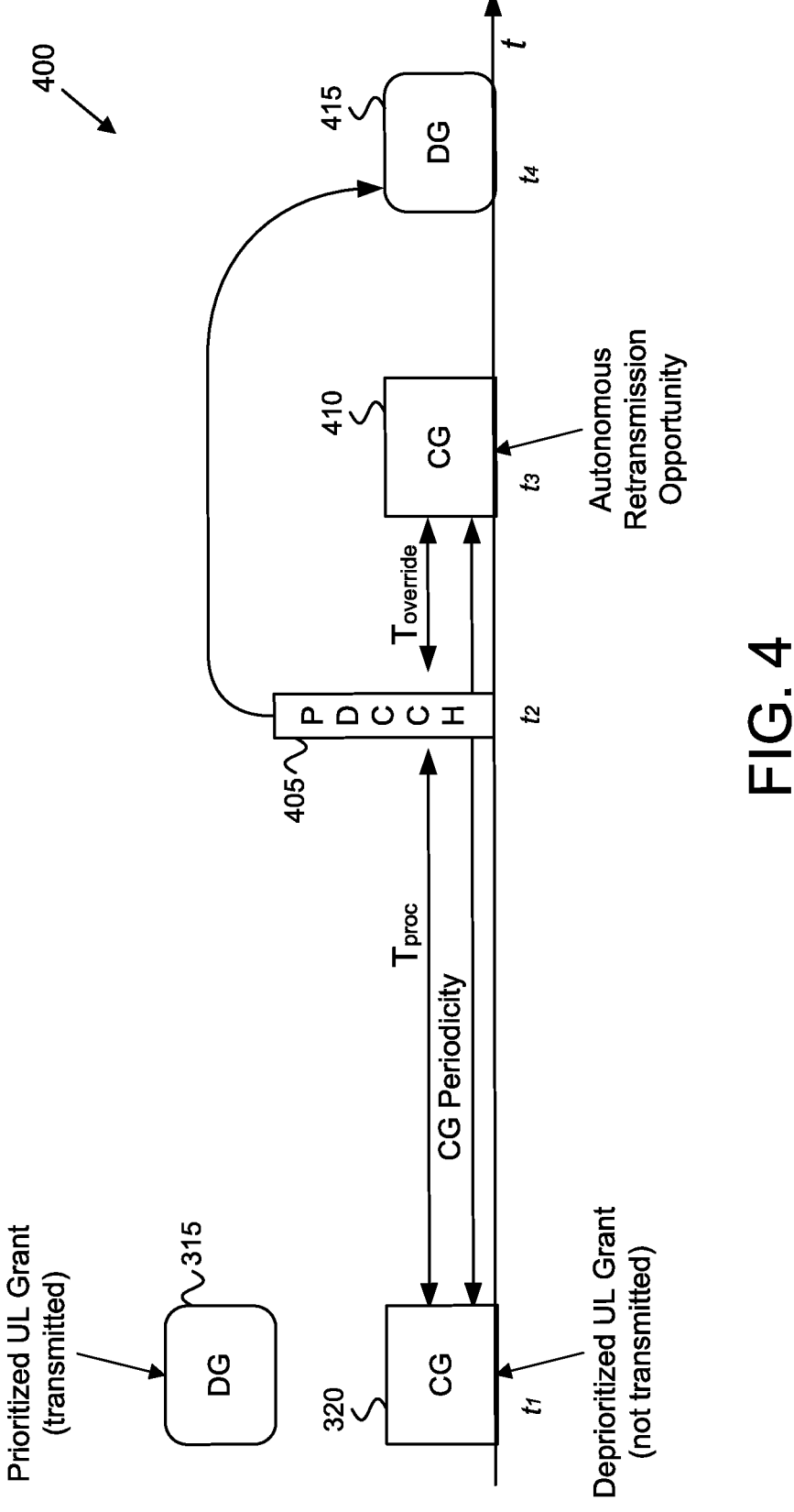
FIG. 4 is a diagram illustrating one embodiment of handling autonomous retransmission in conjunction with switching an active bandwidth part.

FIG. 4 depicts a second scenario 400 for autonomous retransmission, according to embodiments of the disclosure. The second scenario 400 involves a UE 205 configured for autonomous retransmission, which may be one implementation of the remote unit 105 described above. As discussed previously, the UE 205 may be an I-IoT device. However, the second solution is not limited to I-IoT devices, but may be also be performed by other types of UE configured for autonomous retransmission.

In the second scenario 400, the UE 205 has a first UL configured grant ("CG1"). The UE 205 prepares (e.g., generates) a TB (i.e., MAC PDU) for transmission at time $t_1$ using the first GC. As depicted, first resources 320 of the first CG may overlap in time with a first dynamic grant 315, e.g., both grants may have an overlapping PUSCH duration, i.e., at time $t_1$. As discussed above, current standards do not define UE behavior for cases where a dynamic retransmission grant and a configured uplink grant—used for autonomous retransmission—have an overlapping PUSCH duration.

According to the second solution, the UE 205 is to prioritize a dynamically scheduled retransmission, i.e., a retransmission scheduled by PDCCH, over an autonomous retransmission on a configured uplink grant, for cases when the PUSCH duration(s) of both grants are overlapping and where the priorities of both grant are equal (e.g., where the same MAC PDU is scheduled for transmission by the two grants). Thus, the UE 205 prioritizes the dynamic uplink grant 315 scheduling dynamic retransmission grant over the configured uplink grant 320 used for autonomous retransmission. Where the priorities of the grants are not equal, the UE 205 may follow whichever grant has higher priority. In the depicted embodiment, the first occurring configured grant (i.e., first resources 320) is deprioritized in favor of the dynamic grant ("DG") 315 that overlaps with the first CG.

At time $t_2$ the UE 205 receives—via PDCCH 405—receives DCI scheduling retransmission of the data packet (e.g., MAC PDU) generated for the first CG. This corresponds to the DG 415, having UL resources at time $t_4$. However, note that a second occurrence 410 of the first CG at time $t_3$ provides for an autonomous retransmission opportunity—i.e., for transmitting the deprioritized MAC PDU/TB. The second occurrence 410 of the first CG (also referred to as the configured uplink grant PUSCH 410) occurs a specified time after the first occurring configured grant resources 320, i.e., according to a CG periodicity.

According to one implementation of the second solution, the UE 205—i.e., a MAC entity configured with lch-basedPrioritization—prioritizes a dynamic grant for retransmission over a configured grant, e.g., used for autonomous retransmission, for cases when the PUSCH duration(s) are overlapping and the HARQ process scheduled by both grants is the same.

According to a further implementation of the second solution, the UE 205 does not perform (e.g., cancels) an autonomous retransmission on a configured uplink grant for cases when the retransmission of the MAC PDU/TB is dynamically scheduled on PUSCH resources 415 which are occurring after the configured uplink grant PUSCH 410 on which autonomous retransmission would have been performed otherwise (when no PDCCH was received scheduling the retransmission). It is assumed here that the PDCCH 405 scheduling the retransmission is received at least some predefined time (e.g., $T_{override}$) before the first symbol of the PUSCH 410 associated with the configured uplink grant providing transmission opportunity for autonomous retransmission.

As shown in FIG. 4, the PDCCH 405 scheduling the retransmission for the deprioritized MAC PDU (i.e., HARQ process) is received before the cut-off time, i.e., the preconfigured time $T_{override}$ before the start of the configured uplink grant PUSCH 410 used for autonomous retransmission. Therefore, the UE 205 does not perform the autonomous retransmission (e.g., cancels the autonomous retransmission) using the configured uplink grant PUSCH 410, which would have been performed otherwise in the absence of the PDCCH.

Figure 5:
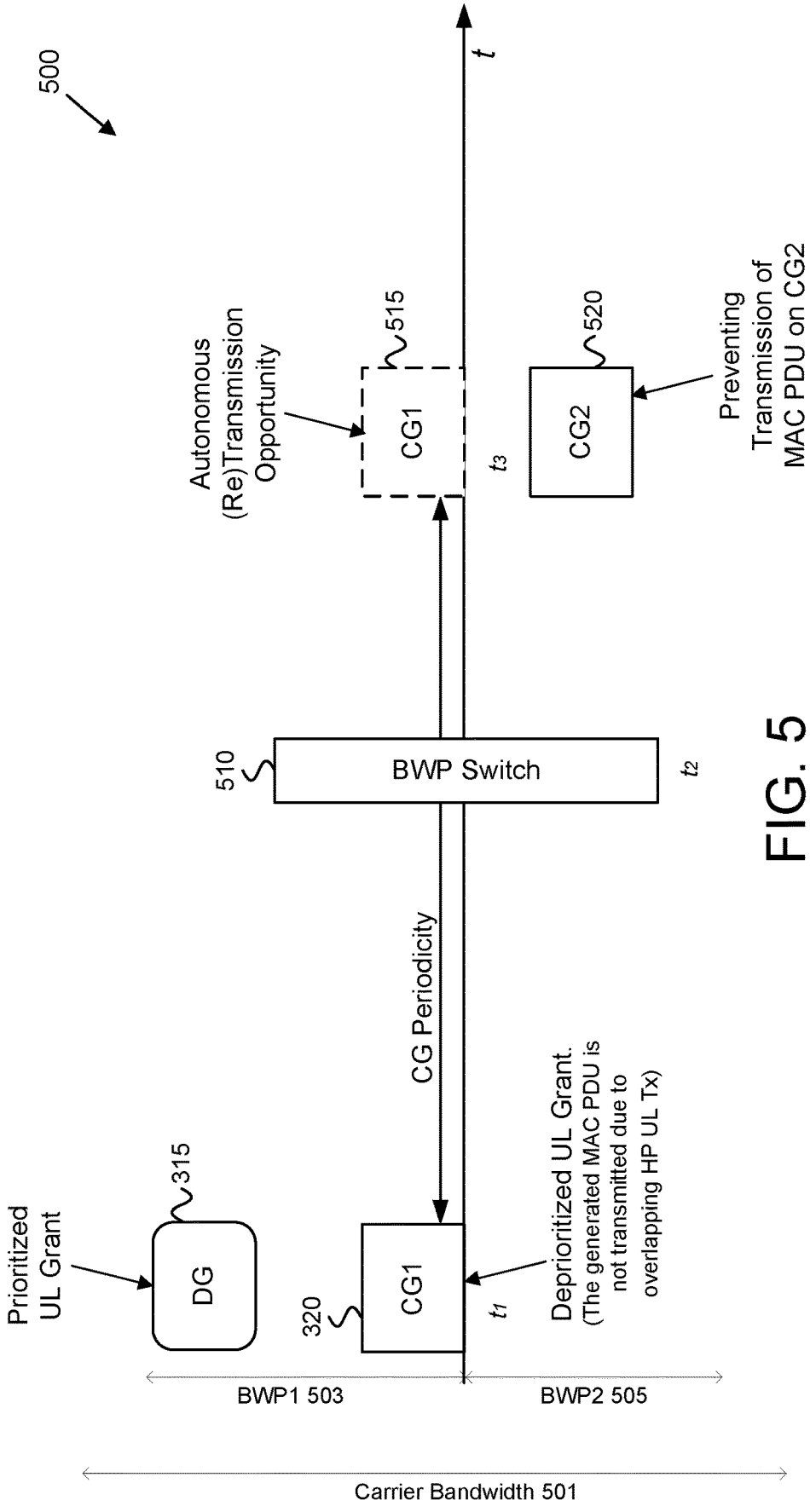
FIG. 5 is a block diagram illustrating one embodiment of a NR protocol stack.

FIG. 5 depicts a third scenario 500 for autonomous retransmission, according to embodiments of the disclosure. The third scenario 500 involves a UE 205 configured for autonomous retransmission, which may be one implementation of the remote unit 105 described above. As discussed previously, the UE 205 may be an I-IoT device. However, the third solution is not limited to I-IoT devices, but may be also be performed by other types of UE configured for autonomous retransmission.

In the third scenario 500, the UE 205 has a first UL CG for a first UL BWP 503. The UE 205 prepares (e.g., generates) a TB (i.e., MAC PDU) for transmission at time $t_1$ using the first GC. As depicted, first resources 320 of the first CG may overlap in time with a first dynamic grant 315. As described above, both grants may have an overlapping PUSCH duration, e.g., at time $t_1$. As discussed above the UE behavior for cases when BWP is changed/switched after the time when a configured uplink grant was deprioritized and before the time instance when autonomous retransmission takes place is currently not defined in specifications.

According to the third solution, the UE 205 does not perform an autonomous retransmission for cases when the active uplink BWP is changed after the time instance where a configured uplink grant was deprioritized and before the autonomous retransmission was performed.

In the depicted scenario 300, the UE 205 prioritizes the dynamic uplink grant 315 scheduling dynamic retransmission grant over the configured uplink grant 320, e.g., due to detecting a higher priority UL transmission (i.e., dynamic uplink grant 315) overlapping in time with the first resources 320 of the first CG. Here it is assumed that the first CG is associated with a first HARQ process.

At time $t_2$, after the time instance $t_1$ where the configured uplink grant 320 was deprioritized (and not transmitted) and prior to time $t_3$ of second resources 515 of the first CG for autonomous retransmission opportunity, the UE 205 switches 510 its active UL BWP, e.g., from the first BWP 503 to the second BWP 505. Here, each BWP 503, 505 is a subset of the overall carrier bandwidth 501. Switching the active UL BWP means deactivating the first BWP 503 and activating the second BWP 505, so that the second BWP 505 becomes the active UL BWP.

In the depicted scenario 300, the UE 205 does not transmit the previously generated MAC PDU/TB using the second resources 515 of the first CG for autonomous retransmission opportunity because the first BWP 503 is no longer active. Additionally, the UE 205 has been allocated a second UL configured grant (depicted as "CG2") for the second uplink BWP 505 associated with the first HARQ process. Here, it is assumed that the BWP switch 510 occurs sufficiently before the next occurring UL resources 520 of the second CG to allow for preparation of a TB.

However, in response to determining that the previous UL CG associated with the first HARQ process was on a different UL BWP than the second UL BWP, the UE 205 does not consider the MAC PDU as having been obtained, i.e., does not perform autonomous transmission of the deprioritized MAC PDU/TB. In other words, the UE 205 does not instruct the first HARQ process to trigger a transmission of the MAC PDU, thus preventing transmission of the MAC PDU on PUSCH resources 520 of the second CG.

According to some embodiments of the third solution, the UE 205 resets/initiates the priority status (prioritized/deprioritized) of each uplink configured grant when switching the UL BWP. In one specific implementation, the UE 205 sets the priority status of a configured uplink grant to prioritized when activating a UL BWP. In another specific implementation, the UE 205 clears the HARQ transmissions buffer—at least the HARQ buffer of the HARQ processes associated with the configured grants—when deactivating a UL BWP. Moreover, the UE 205 may further stop the CG-timer (configured grant timer).

According to an alternative embodiment, the criteria whether to trigger/perform an autonomous retransmission are assessed between a configured uplink grant at the present time and a previous configured uplink grant which was deprioritized, irrespective of whether the BWP has changed in between. Following this alternative embodiment, the UE 205 may perform an autonomous retransmission for a deprioritized uplink grant/MAC PDU after the BWP has been changed on the new activated uplink BWP. Note that the autonomous retransmission can only be performed when the new active BWP has the same uplink grant configuration as the CG configuration on the previous active BWP for the configured uplink grant was deprioritized. For example, the first CG and the second CG having the same transport block size ("TBS").

According to one implementation of the alternative embodiment, the UE 205 stores the priority status (prioritized/deprioritized) of a configured uplink grant when switching/changing the UL BWP. According to one implementation of the alternative embodiment, the UE 205 keeps the HARQ buffer content of the HARQ process associated with the configured uplink grant when switching/changing the UL BWP.

Figure 6:
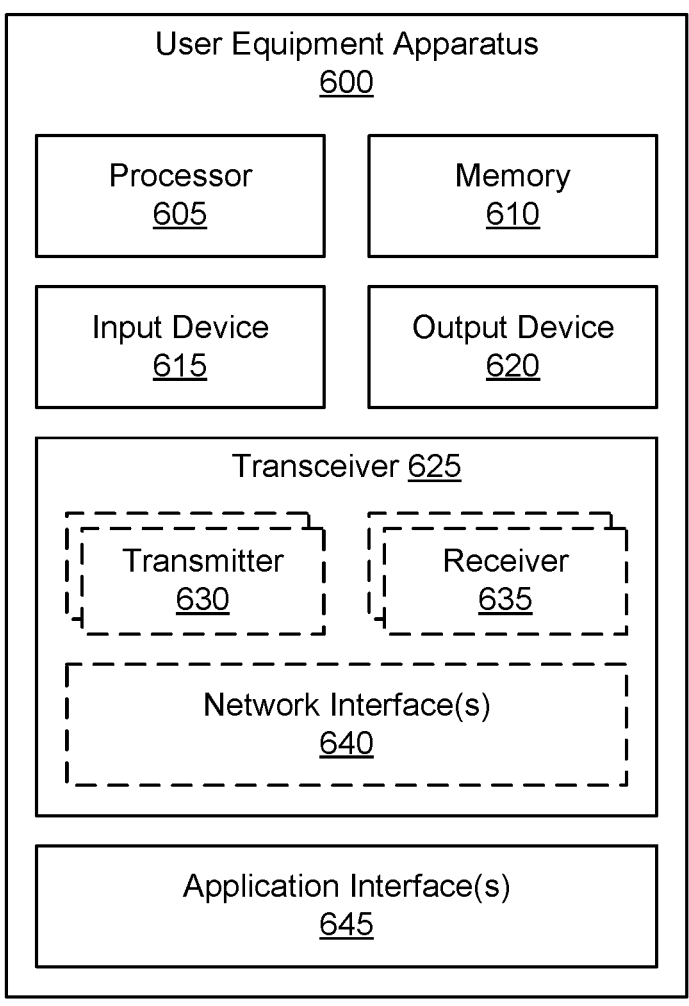
FIG. 6 is a diagram illustrating one embodiment of a user equipment apparatus.

FIG. 6 depicts a user equipment apparatus 600 that may be used for handling autonomous retransmission, according to embodiments of the disclosure. In various embodiments, the user equipment apparatus 600 is used to implement one or more of the solutions described above. The user equipment apparatus 600 may be one embodiment of the remote unit 105 and/or the UE 205, described above. Furthermore, the user equipment apparatus 600 may include a processor 605, a memory 610, an input device 615, an output device 620, and a transceiver 625.

In some embodiments, the input device 615 and the output device 620 are combined into a single device, such as a touchscreen. In certain embodiments, the user equipment apparatus 600 may not include any input device 615 and/or output device 620.

output device 620. In various embodiments, the user equipment apparatus 600 may include one or more of: the processor 605, the memory 610, and the transceiver 625, and may not include the input device 615 and/or the output device 620.

As depicted, the transceiver 625 includes at least one transmitter 630 and at least one receiver 635. Here, the transceiver 625 communicates with one or more cells supported by one or more base units 121. Additionally, the transceiver 625 may support at least one network interface 640 and/or application interface 645. The application interface(s) 645 may support one or more APIs. The network interface(s) 640 may support 3GPP reference points, such as Uu and PCS. Other network interfaces 640 may be supported, as understood by one of ordinary skill in the art.

The processor 605, in one embodiment, may include any known controller capable of executing computer-readable instructions and/or capable of performing logical operations. For example, the processor 605 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 605 executes instructions stored in the memory 610 to perform the methods and routines described herein. The processor 605 is communicatively coupled to the memory 610, the input device 615, the output device 620, and the transceiver 625.

In various embodiments, the processor 605 controls the user equipment apparatus 600 to implement the above described UE behaviors. For example, while the transceiver 625 operates on a first BWP, the processor 605 generates a first MAC PDU for transmission on a first UL CG associated with a first HARQ process, the first UL CG being for the first UL BWP. Here, the first BWP may include a first UL BWP and a first DL BWP.

The processor 605 deprioritizes the first UL CG in response to detecting a higher priority UL transmission overlapping with the first UL CG. Here, deprioritizing the first UL CG includes not performing a transmission of the generated MAC PDU. The processor 605 switches an active UL BWP from the first UL BWP to a second UL BWP after deprioritizing the first UL CG. Here, switching from the first UL BWP to the second UL BWP includes deactivating the first UL BWP and also activating the second UL BWP. Note that switching the active BWP may include the processor 605 re-tuning and/or reconfiguring the transceiver 625 from operating on the first UL BWP to operating on the second UL BWP. Via the transceiver 625, the processor 605 receives a second UL CG associated with the first HARQ process on the second UL BWP. In certain embodiments, the first UL CG and the second UL CG have the same transport block size.

The processor 605 prevents the first HARQ process from triggering a transmission of the first MAC PDU on the second UL CG in response to determining that the first UL CG associated with the first HARQ process was on a different UL BWP than the second UL BWP. In certain embodiments, preventing the first HARQ process from triggering the transmission of the first MAC PDU on the second UL CG may include the processor 605 not instructing the HARQ process to trigger a transmission of the MAC PDU. Additionally, the processor 605 may not considering the MAC PDU as having been obtained in response to determining that the first UL CG associated with the first HARQ process was on a different UL BWP than the second UL BWP.

In some embodiments, the processor 605 clears a HARQ buffer for a HARQ process associated with the first UL CG upon deactivating the first BWP. In some embodiments, the processor 605 stops a CG timer associated with the first UL CG in response to switching from the first BWP to a second BWP. Note that a BWP may comprise an UL BWP and a DL BWP. In some embodiments, the processor 605 activates a second UL CG in response to switching from the first BWP to the second BWP, the second CG being previously associated with the second BWP.

In some embodiments, the processor 605 associates a HARQ buffer of the first UL CG with the second UL CG upon receiving the second UL CG. In some embodiments, the processor 605 prioritizes the second UL CG in response to switching from the first BWP to the second BWP. In some embodiments, the processor 605 transfers the deprioritized status of the first UL CG to the second UL CG in response to switching from the first BWP to the second BWP.

The memory 610, in one embodiment, is a computer readable storage medium. In some embodiments, the memory 610 includes volatile computer storage media. For example, the memory 610 may include a RAM, including dynamic RAM ("DRAM"), synchronous dynamic RAM ("SDRAM"), and/or static RAM ("SRAM"). In some embodiments, the memory 610 includes non-volatile computer storage media. For example, the memory 610 may include a hard disk drive, a flash memory, or any other suitable non-volatile computer storage device. In some embodiments, the memory 610 includes both volatile and non-volatile computer storage media.

In some embodiments, the memory 610 stores data related to handling autonomous retransmission. For example, the memory 610 may store MAC PDUs, BWP configuration, UL resource configurations, CG configurations, and the like. In certain embodiments, the memory 610 also stores program code and related data, such as an operating system or other controller algorithms operating on the apparatus 600.

The input device 615, in one embodiment, may include any known computer input device including a touch panel, a button, a keyboard, a stylus, a microphone, or the like. In some embodiments, the input device 615 may be integrated with the output device 620, for example, as a touchscreen or similar touch-sensitive display. In some embodiments, the input device 615 includes a touchscreen such that text may be input using a virtual keyboard displayed on the touchscreen and/or by handwriting on the touchscreen. In some embodiments, the input device 615 includes two or more different devices, such as a keyboard and a touch panel.

The output device 620, in one embodiment, is designed to output visual, audible, and/or haptic signals. In some embodiments, the output device 620 includes an electronically controllable display or display device capable of outputting visual data to a user. For example, the output device 620 may include, but is not limited to, an LCD display, an LED display, an OLED display, a projector, or similar display device capable of outputting images, text, or the like to a user. As another, non-limiting, example, the output device 620 may include a wearable display separate from, but communicatively coupled to, the rest of the user equipment apparatus 600, such as a smart watch, smart glasses, a heads-up display, or the like. Further, the output device 620 may be a component of a smart phone, a personal digital assistant, a television, a table computer, a notebook (laptop) computer, a personal computer, a vehicle dashboard, or the like.

In certain embodiments, the output device 620 includes one or more speakers for producing sound. For example, the output device 620 may produce an audible alert or notification (e.g., a beep or chime). In some embodiments, the output device 620 includes one or more haptic devices for producing vibrations, motion, or other haptic feedback. In some embodiments, all or portions of the output device 620 may be integrated with the input device 615. For example, the input device 615 and output device 620 may form a touchscreen or similar touch-sensitive display. In other embodiments, the output device 620 may be located near the input device 615.

The transceiver 625 includes at least transmitter 630 and at least one receiver 635. One or more transmitters 630 may be used to provide UL communication signals to a base unit 121, such as the UL transmissions described herein. Similarly, one or more receivers 635 may be used to receive DL communication signals from the base unit 121, as described herein. Although only one transmitter 630 and one receiver 635 are illustrated, the user equipment apparatus 600 may have any suitable number of transmitters 630 and receivers 635. Further, the transmitter(s) 630 and the receiver(s) 635 may be any suitable type of transmitters and receivers. In one embodiment, the transceiver 625 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 625, transmitters 630, and receivers 635 may be implemented as physically separate components that access a shared hardware resource and/or software resource, such as for example, the network interface 640.

In various embodiments, one or more transmitters 630 and/or one or more receivers 635 may be implemented and/or integrated into a single hardware component, such as a multi-transceiver chip, a system-on-a-chip, an ASIC, or other type of hardware component. In certain embodiments, one or more transmitters 630 and/or one or more receivers 635 may be implemented and/or integrated into a multi-chip module. In some embodiments, other components such as the network interface 640 or other hardware components/circuits may be integrated with any number of transmitters 630 and/or receivers 635 into a single chip. In such embodiment, the transmitters 630 and receivers 635 may be logically configured as a transceiver 625 that uses one more common control signals or as modular transmitters 630 and receivers 635 implemented in the same hardware chip or in a multi-chip module.

Figure 7:
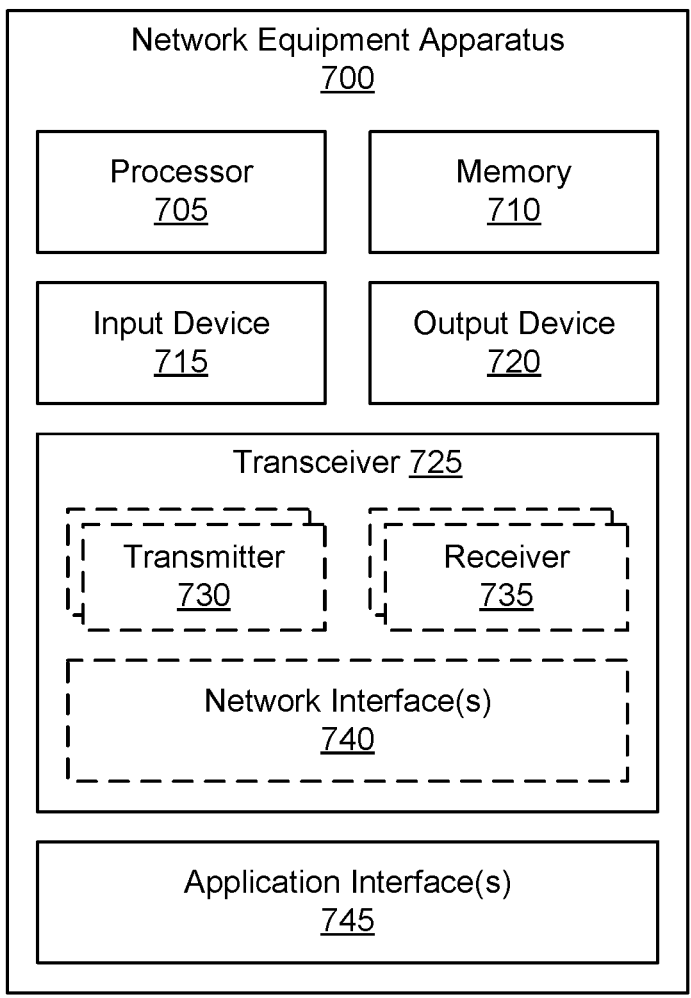
FIG. 7 is a diagram illustrating one embodiment of a network equipment apparatus.

FIG. 7 depicts one embodiment of a network equipment apparatus 700 that may be used for handling autonomous retransmission, according to embodiments of the disclosure. In some embodiments, the network equipment apparatus 700 may be one embodiment of a RAN node and its supporting hardware, such as the base unit 121, RAN node 211 and/or gNB, described above. Furthermore, network equipment apparatus 700 may include a processor 705, a memory 710, an input device 715, an output device 720, and a transceiver 725. In certain embodiments, the network equipment apparatus 700 does not include any input device 715 and/or output device 720.

As depicted, the transceiver 725 includes at least one transmitter 730 and at least one receiver 735. Here, the transceiver 725 communicates with one or more remote units 105. Additionally, the transceiver 725 may support at least one network interface 740 and/or application interface 745. The application interface(s) 745 may support one or more APIs. The network interface(s) 740 may support 3GPP reference points, such as Uu, N1, N2 and N3. Other network interfaces 740 may be supported, as understood by one of ordinary skill in the art.

The processor 705, in one embodiment, may include any known controller capable of executing computer-readable instructions and/or capable of performing logical operations. For example, the processor 705 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 705 executes instructions stored in the memory 710 to perform the methods and routines described herein. The processor 705 is communicatively coupled to the memory 710, the input device 715, the output device 720, and the transceiver 725.

In various embodiments, the processor 705 controls the network equipment apparatus 700 to implement the above described RAN node behaviors. For example, the processor 705 may support one or more serving cells that serve a UE. In various embodiments, the transceiver 725 may configure a CG for a UE, as described herein. Moreover, the processor 705 may configure one or more BWP for the UE, as described herein.

The memory 710, in one embodiment, is a computer readable storage medium. In some embodiments, the memory 710 includes volatile computer storage media. For example, the memory 710 may include a RAM, including dynamic RAM ("DRAM"), synchronous dynamic RAM ("SDRAM"), and/or static RAM ("SRAM"). In some embodiments, the memory 710 includes non-volatile computer storage media. For example, the memory 710 may include a hard disk drive, a flash memory, or any other suitable non-volatile computer storage device. In some embodiments, the memory 710 includes both volatile and non-volatile computer storage media.

In some embodiments, the memory 710 stores data relating to handling autonomous retransmission, for example storing UE identities, BWP configuration, UL resource configurations, CG configurations, and the like. In certain embodiments, the memory 710 also stores program code and related data, such as an operating system ("OS") or other controller algorithms operating on the network equipment apparatus 700 and one or more software applications.

The input device 715, in one embodiment, may include any known computer input device including a touch panel, a button, a keyboard, a stylus, a microphone, or the like. In some embodiments, the input device 715 may be integrated with the output device 720, for example, as a touchscreen or similar touch-sensitive display. In some embodiments, the input device 715 includes a touchscreen such that text may be input using a virtual keyboard displayed on the touchscreen and/or by handwriting on the touchscreen. In some embodiments, the input device 715 includes two or more different devices, such as a keyboard and a touch panel.

The output device 720, in one embodiment, may include any known electronically controllable display or display device. The output device 720 may be designed to output visual, audible, and/or haptic signals. In some embodiments, the output device 720 includes an electronic display capable of outputting visual data to a user. Further, the output device 720 may be a component of a smart phone, a personal digital assistant, a television, a table computer, a notebook (laptop) computer, a personal computer, a vehicle dashboard, or the like.

In certain embodiments, the output device 720 includes one or more speakers for producing sound. For example, the output device 720 may produce an audible alert or notification (e.g., a beep or chime). In some embodiments, the output device 720 includes one or more haptic devices for producing vibrations, motion, or other haptic feedback. In some embodiments, all or portions of the output device 720 may be integrated with the input device 715. For example, the input device 715 and output device 720 may form a touchscreen or similar touch-sensitive display. In other embodiments, all or portions of the output device 720 may be located near the input device 715.

As discussed above, the transceiver 725 may communicate with one or more remote units and/or with one or more network functions that provide access to one or more PLMNs. The transceiver 725 operates under the control of the processor 705 to transmit messages, data, and other signals and also to receive messages, data, and other signals. For example, the processor 705 may selectively activate the transceiver (or portions thereof) at particular times in order to send and receive messages.

The transceiver 725 may include one or more transmitters 730 and one or more receivers 735. In certain embodiments, the one or more transmitters 730 and/or the one or more receivers 735 may share transceiver hardware and/or circuitry. For example, the one or more transmitters 730 and/or the one or more receivers 735 may share antenna(s), antenna tuner(s), amplifier(s), filter(s), oscillator(s), mixer(s), modulator/demodulator(s), power supply, and the like. In one embodiment, the transceiver 725 implements multiple logical transceivers using different communication protocols or protocol stacks, while using common physical hardware.

FIG. 8 depicts one embodiment of a method 800 for handling autonomous retransmission, according to embodiments of the disclosure. In various embodiments, the method 800 is performed by a UE, such as the remote unit 105, the UE 205 and/or the user equipment apparatus 600, described above. In some embodiments, the method 800 is performed by a processor, such as a microcontroller, a microprocessor, a CPU, a GPU, an auxiliary processing unit, a FPGA, or the like.

The method 800 begins and generates 805 a first MAC PDU for transmission on a first UL CG associated with a first HARQ process, the first UL CG being for a first UL BWP. The method 800 includes deprioritizing 810 the first UL CG and not performing a transmission of the generated MAC PDU in response to detecting a higher priority UL transmission overlapping with the first UL CG. Here, deprioritizing 810 the first UL CG in response to detecting a higher priority UL transmission overlapping with the first UL CG includes not performing a transmission of the generated MAC PDU.

The method 800 includes switching 815 an active UL BWP from the first UL BWP to a second UL BWP after deprioritizing the first UL CG. The method 800 includes receiving 820 a second UL CG associated with the first HARQ process on the second UL BWP. In response to determining that the first UL CG associated with the first HARQ process was on a different UL BWP than the second UL BWP, the first method includes preventing 825 the first HARQ process from triggering a transmission of the first MAC PDU on the second UL CG. The method 800 ends.

Disclosed herein is a first apparatus for handling autonomous retransmission, according to embodiments of the disclosure. The first apparatus may be implemented by a UE, such as the remote unit 105, the UE 205 and/or the user equipment apparatus 600, described above. The first apparatus includes a transceiver that operates on a first BWP. Here, the first BWP may include a first UL BWP and a first DL BWP. The first apparatus includes a processor that generates a first MAC PDU for transmission on a first UL CG associated with a first HARQ process, the first UL CG being for the first UL BWP. The processor deprioritizes the first UL CG in response to detecting a higher priority UL transmission overlapping with the first UL CG. Here, deprioritizing the first UL CG includes not performing a transmission of the generated MAC PDU (i.e., first MAC PDU). The processor switches an active UL BWP from the first UL BWP to a second UL BWP after deprioritizing the first UL CG and receives a second UL CG associated with the first HARQ process on the second UL BWP. The processor prevents the first HARQ process from triggering a transmission of the first MAC PDU on the second UL CG in response to determining that the first UL CG associated with the first HARQ process was on a different UL BWP than the second UL BWP.

In some embodiments, the processor clears a HARQ buffer for a HARQ process associated with the first UL CG upon deactivating the first UL BWP. In some embodiments, the processor stops a CG timer associated with the first UL CG in response to switching from the first UL BWP to the second UL BWP. In some embodiments, the processor activates the second UL CG in response to switching from the first UL BWP to the second UL BWP, the second UL CG being previously associated with the second UL BWP. In certain embodiments, the first UL CG and the second UL CG have the same transport block size.

In some embodiments, the processor associates a HARQ buffer of the first UL CG with the second UL CG upon receiving the second UL CG. In some embodiments, the processor prioritizes the second UL CG in response to switching from the first UL BWP to the second UL BWP. In some embodiments, the processor transfers the deprioritized status of the first UL CG to the second UL CG in response to switching from the first UL BWP to the second UL BWP.

Disclosed herein is a first method for handling autonomous retransmission, according to embodiments of the disclosure. The first method may be performed by a UE, such as the remote unit 105, the UE 205 and/or the user equipment apparatus 600, described above. The first method includes generating a first MAC PDU for transmission on a first UL CG associated with a first HARQ process, the first UL CG being for a first UL BWP. The first method includes deprioritizing the first UL CG and not performing a transmission of the generated MAC PDU (i.e., first MAC PDU) in response to detecting a higher priority UL transmission overlapping with the first UL CG. The first method includes switching an active UL BWP from the first UL BWP to a second UL BWP after deprioritizing the first UL CG and receiving a second UL CG associated with the first HARQ process on the second UL BWP. In response to determining that the first UL CG associated with the first HARQ process was on a different UL BWP than the second UL BWP, the first method includes preventing the first HARQ process from triggering a transmission of the first MAC PDU on the second UL CG.

In some embodiments, the first method includes clearing a HARQ buffer for a HARQ process associated with the first UL CG upon deactivating the first UL BWP. In some embodiments, the first method includes stopping a CG timer associated with the first UL CG in response to switching from the first UL BWP to a second UL BWP. In some embodiments, the first method includes activating the second UL CG in response to switching from the first UL BWP to the second UL BWP, the second UL CG being previously associated with the second UL BWP. In certain embodiments, the first UL CG and the second UL CG have the same transport block size.

In some embodiments, the first method includes associating a HARQ buffer of the first UL CG with the second UL CG upon receiving the second UL CG. In some embodiments, the first method includes prioritizing the second UL CG in response to switching from the first UL BWP to the second UL BWP. In some embodiments, the first method includes transferring the deprioritized status of the first UL CG to the second UL CG in response to switching from the first UL BWP to the second UL BWP.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of a user equipment ("UE"), the method comprising:

receiving a configuration for autonomous retransmission on a first uplink ("UL") configured grant ("CG");

generating a first medium access control ("MAC") protocol data unit ("PDU") for transmission on the first UL CG associated with a first hybrid automatic repeat request ("HARQ") process, the first UL CG being for a first UL bandwidth part ("BWP");

deprioritizing the first UL CG and not performing a transmission of the first MAC PDU in response to detecting a higher priority UL transmission overlapping with the first UL CG, wherein not performing the transmission of the first MAC PDU triggers an autonomous retransmission of the first MAC PDU;

switching an active UL BWP from the first UL BWP to a second UL BWP after deprioritizing the first UL CG and prior to performing the autonomous retransmission of the first MAC PDU;

receiving a second UL CG associated with the first HARQ process on the second UL BWP, wherein the first UL CG and the second UL CG have a same transport block size; and preventing the first HARQ process from triggering an autonomous transmission of the first MAC PDU on the second UL CG in response to determining that the first UL CG associated with the first HARQ process was on a different UL BWP than the second UL BWP.

2. The method of claim 1, further comprising clearing a HARQ buffer for the HARQ process associated with the first UL CG upon deactivating the first UL BWP.

3. The method of claim 1, further comprising stopping a CG timer associated with the first UL CG in response to switching from the first UL BWP to the second UL BWP.

4. The method of claim 1, further comprising activating the second UL CG in response to switching from the first UL BWP to the second UL BWP, the second UL CG being previously associated with the second UL BWP.

5. The method of claim 1, further comprising associating a HARQ buffer of the first UL CG with the second UL CG upon receiving the second UL CG.

6. The method of claim 1, further comprising prioritizing the second UL CG in response to switching from the first UL BWP to the second UL BWP.

7. The method of claim 1, further comprising transferring a deprioritized status of the first UL CG to the second UL CG in response to switching from the first UL BWP to the second UL BWP.

8. A user equipment ("UE") comprising:

a transceiver that operates on a first uplink ("UL") bandwidth part ("BWP"); and a processor coupled to the transceiver, the processor configured to cause the UE to:

receive a configuration for autonomous retransmission on a first uplink ("UL") configured grant ("CG");

generate a first medium access control ("MAC") protocol data unit ("PDU") for transmission on the first UL CG associated with a first hybrid automatic repeat request ("HARQ") process, the first UL CG being for a first UL bandwidth part ("BWP");

deprioritize the first UL CG and not performing a transmission of the first MAC PDU in response to detecting a higher priority UL transmission overlapping with the first UL CG, wherein not performing the transmission of the first MAC PDU triggers an autonomous retransmission of the first MAC PDU;

switch an active UL BWP from the first UL BWP to a second UL BWP after deprioritizing the first UL CG and prior to performing the autonomous retransmission of the first MAC PDU;

receive a second UL CG associated with the first HARQ process on the second UL BWP, wherein the first UL CG and the second UL CG have a same transport block size; and prevent the first HARQ process from triggering an autonomous transmission of the first MAC PDU on the second UL CG in response to determining that the first UL CG associated with the first HARQ process was on a different UL BWP than the second UL BWP.

9. The UE of claim 8, wherein the processor is further configured to cause the UE to clear a HARQ for the HARQ process associated with the first UL CG upon deactivating the first UL BWP.

10. The UE of claim 9, wherein the processor is further configured to cause the UE to stop a CG timer associated with the first UL CG in response to switching from the first UL BWP to the second UL BWP.

11. The UE of claim 8, wherein the processor is further configured to cause the UE to activate the second UL CG in response to switching from the first UL BWP to the second UL BWP, the second UL CG being previously associated with the second UL BWP.

12. The UE of claim 8, wherein the processor is further configured to cause the UE to associate a HARQ buffer of the first UL CG with the second UL CG upon receiving the second UL CG.

13. The UE of claim 8, wherein the processor is further configured to cause the UE to prioritize the second UL CG in response to switching from the first UL BWP to the second UL BWP.

14. The UE of claim 8, wherein the processor is further configured to cause the UE to transfer a deprioritized status of the first UL CG to the second UL CG in response to switching from the first UL BWP to the second UL BWP.

15. A processor for wireless communication, comprising:

at least one controller coupled with at least one memory and configured to cause the processor to:

receive a configuration for autonomous retransmission on first uplink ("UL") configured grant ("CG");　　5 generate a first medium access control ("MAC") protocol data unit ("PDU") for transmission on the first UL CG, wherein the first UL CG is associated with a first hybrid automatic repeat request ("HARQ") process, wherein the first UL CG is for a first UL bandwidth part　10 ("BWP");

deprioritize the first UL CG and not perform a transmission of the first MAC PDU in response to detecting a higher priority UL transmission overlapping with the first UL CG, wherein not performing the transmission　15 of the first MAC PDU triggers an autonomous retransmission of the first MAC PDU;

switch an active UL BWP from the first UL BWP to a second UL BWP after deprioritizing the first UL CG and prior to performing the autonomous retransmission　20 of the first MAC PDU; and receive a second UL CG associated with the first HARQ process on the second UL BWP, wherein the first UL CG and the second UL CG have a same transport block size; and　25 prevent the first HARQ process from triggering an autonomous transmission of the first MAC PDU on the second UL CG in response to determining that the first UL CG associated with the first HARQ process was on a different UL BWP than the second UL BWP.　30

\*　　\*　　\*　　\*　　\*